Figure 1:
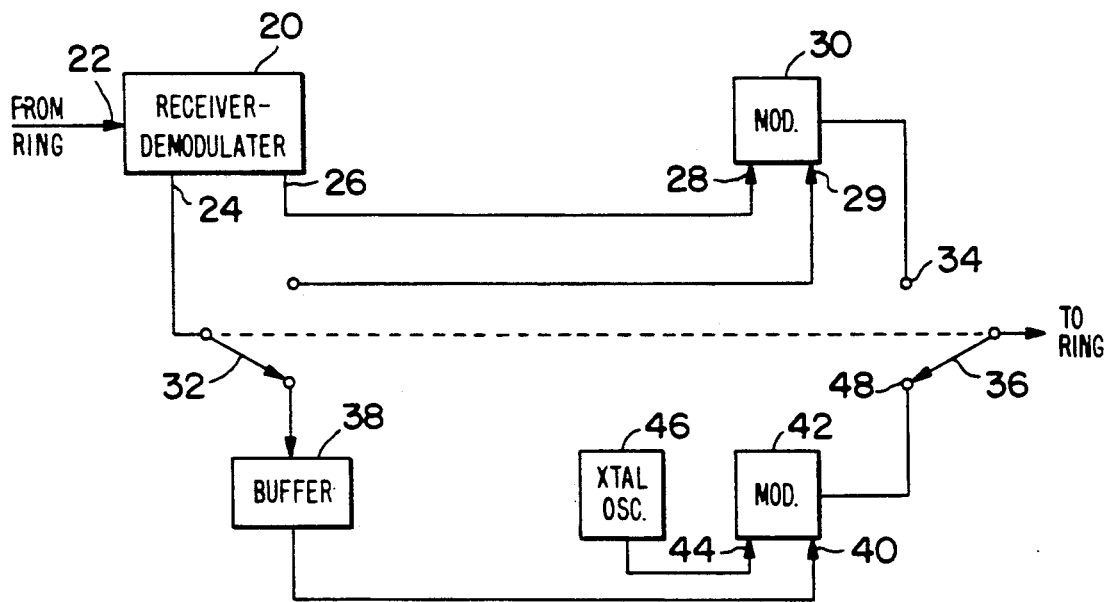

United States Patent [19]

Marshall et al.

[11] Patent Number: 5,090,025
[45] Date of Patent: Feb. 18, 1992

[54] TOKEN RING SYNCHRONIZATION

[75] Inventors: Alan C. Marshall, Framingham; Stuart P. MacEachern, Uxbridge; Howard C. Salwen, Newtonville, all of Mass.

[73] Assignee: Proteon, Inc., Westboro, Mass.

[21] Appl. No.: 558,197

[22] Filed: Jul. 24, 1990

[51] Int. Cl.⁵ .......................... H04L 25/60
[52] U.S. Cl. ...................... 375/4; 375/118; 370/108
[58] Field of Search ............ 375/4, 106, 118, 119, 375/120; 370/85.5, 85.12, 85.13, 108; 320/155

[56] References Cited

U.S. PATENT DOCUMENTS

| | | | |
|---|---|---|---|
| 4,320,515 | 3/1982 | Burton, Jr. | 375/4 |
| 4,536,876 | 8/1986 | Bahr et al. | 370/85.15 |
| 4,587,651 | 5/1986 | Nelson et al. | 370/85.13 |
| 4,677,614 | 6/1987 | Circo | 375/118 |
| 4,716,575 | 12/1987 | Dovros et al. | 375/3 |
| 4,733,404 | 3/1988 | Ostoich | 375/4 |
| 4,881,243 | 11/1989 | Whitt | 375/4 |
| 4,893,319 | 1/1990 | Ziuchkovski | 375/119 |
| 4,910,755 | 3/1990 | Knapp | 328/155 |
| 4,953,163 | 8/1990 | Miyamoto et al. | 375/120 |

Primary Examiner—Stephen Chin
Attorney, Agent, or Firm—Gaston & Snow

[57] ABSTRACT

An improved local area network node of the type described in ANSI/IEEE Standard 802.5, including a receiver-demodulator having an input connectable to the ring and having a received data output and a received clock output, an elasticity buffer connected to the received data output, a modulator for modulating the output of the buffer in accordance with a signal at a clocking input of the modulator, and a phase-locked loop interposed between the received clock output of the demodulator and the clocking input of the modulator, the loop including a voltage-controlled oscillator, a phase detector and a filter connected for providing a control-voltage to the oscillator.

6 Claims, 1 Drawing Sheet

TOKEN RING SYNCHRONIZATION

The present invention relates to local area networks and more particularly to an improved system for synchronization of the operation of a token-passing ring.

Local area networks are used to provide compatible interconnections among electronic data processors. One local area network standard defining a ring, utilizing token-passing, is set forth in ANSI/IEEE Standard 802.5 (An American National Standard; IEEE Standards for Local Area Networks) entitled *Taken Ring Access Method and Physical Layer Specifications*, the same being incorporated herein by reference. A token-passing ring comprises a set of stations or nodes serially connected by a transmission medium in the form of an endless or closed loop, information being transferred sequentially in one direction along the loop, bit by bit, from one active station to the next. Each station generally is an interface unit serving as means for connecting one or more work stations, terminals, computers or the like to the ring so as to permit such stations or the like to communicate with other nodes coupled to the ring. A station given access to the network, can transfer information onto the ring addressed to another station. The addressed station copies the information as it passes and when the information circulates back to the originator, the latter removes the information from the ring.

A station gains the right to transmit its information onto the medium when it detects a token passing through the medium, the token being a unique signal array that circulates in the medium around the ring. Any station may capture the token by modifying it, typically to a start-of-frame sequence and appending control and status fields, address fields, information field, frame-check sequence and end-of-frame sequence. At the completion of information transfer, the station initiates and places a new token onto the ring, providing other stations with an opportunity to gain access to the ring by capture of the token.

Clock and data bit information for token-passing rings are encoded into bit symbols by polarity-independent, differential Manchester coding in which each bit is transmitted for one half of its duration as a signal of one polarity and as a signal of opposite polarity for the remainder of that bit's duration. Signal transitions are then necessarily mid-bit transitions which provides inherent timing information through the transmission channel.

An initialization procedure, defined in the 802.5 Standard, causes one of the nodes to serve as the ring monitor. The ring monitor node, inter alia, provides a synchronization function in which signals received by a node are processed in a phase-locked loop receiver and demodulator. The phase-locked loop has two outputs: a received data output and a received clock output. When the node is operating as a reclocking repeater, the received data is used to modulate the received clock, thus reconstituting the signal for transmission to the next downstream node. When the node has been selected as the ring monitor during the initialization procedure, the received data is modulated onto a crystal oscillator clock which thus acts as the clock reference for the entire system. Each node then tracks a received signal, the basic time reference of which is the crystal oscillator in the ring monitor. The clock rate of the signal traversing the entire ring and returning to the ring monitor is then at the average of the clock rate provided by the crystal oscillator. Due to a number of perturbations, the received clock returning to the monitor fluctuates relative to the original crystal oscillator clock. To follow these clock fluctuations so that no data bits are lost between the reception of data at the monitor and its retransmission at the unperturbed crystal clock rate, an elasticity buffer is usually provided. The latter is usually implemented using a first-in first-out (FIFO) buffer.

The perturbations or clock jitter imposed on the signal passing along the loop are believed to result from three predominant causes and are observable at the received clock output of the demodulator. (C.f. *Jitter in Digital Transmission System*, Trishitta and Varma, Architect House, 1989). Each phase-locked loop receiver-demodulator is disturbed by receiver noise that causes tracking errors in the phase-locked loop. Another source of perturbation arises in the voltage controlled oscillators that are part of the phase-locked loop receiver-demodulator design. Such voltage controlled oscillators are usually not crystal controlled and thus exhibit a considerable amount of noise, some of which is observable as jitter at the received clock output of the demodulator. Lastly, the data itself may cause systemic jitter in the received clock output.

As the signal passes from node to node, the effects of the jitter in each node are additive and tend to accumulate, thus creating a fundamental limitation on the number of nodes in the ring. Current systems aimed at resolving the jitter problem are typically found in the telecommunications industry and involve synchronization of a large number of nodes. One of the most prevalent systems, used in telephone communications uses independent oscillators at each location. Thus, the time reference at the input of each sub-system is not necessarily the same as the time reference at the output. This sliding time reference is accommodated by either adding, i.e., "stuffing", or dropping bits in the sub-system. If the latter is running too fast at its output relative to its input, it occasionally stuffs bits to accommodate for the time difference. If it runs too slowly, it drops bits to accommodate for the time difference. This technique is used, for example, in the fiber distributed data interface (ANSI Standard X3T9.5) An important virtue of the stuff-and-drop technique is that there is no analog coupling between the input and output of a node. Because each output is clocked by an independent crystal oscillator, there is no way for jitter to accumulate in the system.

Accordingly it is a primary object of the present invention to provide a networking node having improved synchronization such that the accumulation of jitter around the ring is reduced relative to that which would otherwise occur in a system built in accordance with the present IEEE 802.5 Standard. Other objects of the present invention are to provide such nodes with the advantages of the stuff-and-drop technique such that the nodes are fully operable and compatible with currently commercially available devices embodying the 802.5 Standard; to provide such nodes that can be assembled using the same components currently used to implement token-passing ring local network interfaces together with a minimum of additional components; and to provide such nodes in which a synchronization technique is implemented to provide better network system performance with less stringent component performance requirements.

The objects of the present invention are effected generally in a local area network of the type described in ANSI/IEEE Standard 802.5, such network typically including a set of nodes serially connected to a transmission medium so that information bits may be transferred sequentially from one active node to the next, one of the nodes serving as a ring monitor. As in the prior art, the ring monitor is formed of the usual receiver-demodulator having a received data output and a received clock output, an elastic buffer having its input connected to the received data output, a master oscillator, and means for modulating the output of the buffer in accordance with the output of said oscillator. In a reclocking node of the present invention, data is modulated onto the clock extracted from the received signal and processed by the receiver-modulator, each reclocking repeater node being configured to provide reduced jitter outputs by using, in part, components that are used normally only when a node is selected as the ring monitor. Thus, a reclocking node of the present invention also employs a master oscillator, a receiver-demodulator, an elasticity buffer and a modulator for modulating the output of the buffer in accordance with the output of the master oscillator, but the latter is voltage-controlled by the output of a phase-locked loop having its input connected to the received clock output of the receiver-demodulator and its output connected to provide the voltage signal controlling the oscillator.

Figure 2:
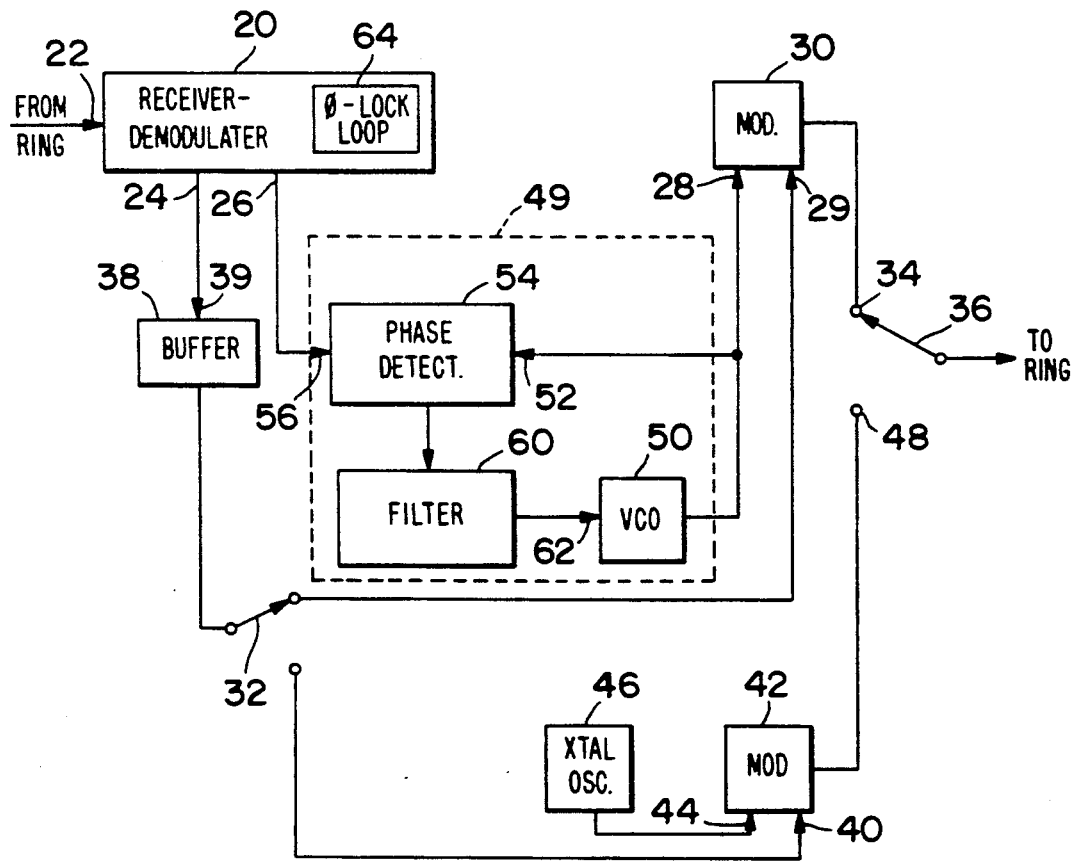

Other objects of the present invention will in part be obvious and will in part appear hereinafter. The invention accordingly comprises the apparatus possessing the construction, combination of elements and arrangement of parts which are exemplified in the following detailed disclosure and the scope of the application of which will be indicated in the claims. For a fuller understanding of the nature and objects of the present invention, reference should be had to the following, detailed description taken in connection with the accompanying drawing wherein:

FIG. 1 is a block diagram of the circuit of a prior art ring node which can be a ring monitor or a reclocking repeater; and FIG. 2 is a block diagram of a circuit embodying the principles of the present invention.

Referring now to FIG. 1, there is shown a typical ring station meeting the requirements set forth for use in a token-passing type of local area network as described in ANSI/IEEE Standard 802.5. Such a network is characterized in comprising a set of stations serially connected to a transmission medium so that information bits may be transferred sequentially from one active station to the next, one of said stations serving as a ring monitor. It is understood that only one monitor in one of the stations is the active monitor at any point in time, the monitor function in all of the other stations being in a standby mode.

Thus, the station shown in FIG. 1 typically comprises phase-locked loop receiver-demodulator 20 having an input terminal 22 connected to the transmission line of the local area network so that signals on the line can be fed to receiver-demodulator 20. The latter has two outputs: received data output 24 and received clock output 26. Received clock output 26 is connected to one input terminal 28 of modulator 30, received data output 24 being connectable to another input terminal 29 of modulator 30 through switch 32. Output terminal 34 of modulator 30 is connectable through switch 36 back to the local area network transmission line. As is well known in the art, when operating as a reclocking repeater, switches 32 and 36, operating in tandem respectively connect output 24 to input 29 of modulator 30 and connect output 34 terminal of the modulator to the transmission line. Thus, in this reclocking mode, the received data is used to modulate in modulator 30 the received clock, thus reconstituting the signal for transmission to the next downstream node or station. The bandwidth of the loop in the receiver-demodulator determines the jitter that is propagated through the node.

The prior art station of FIG. 1 also includes elasticity buffer 38, input terminal 39 of which is connectable through switch 32 to output terminal 24 of receiver-demodulator 20. As is well known, the buffer serves two functions. So that the token may circulate around the ring, the latter must exhibit a time latency of at least the number of bits in the token, and the buffer provides that delay when the station serves as the active monitor. As noted earlier herein, the effects of the jitter in each node are additive as the signal passes from node to node, and tend to drop or add bits of delay as the latency of the ring respectively decreases and increases. In accordance with known prior art, in order to track phase jitter fluctuations on the received clock, the buffer is made elastic with an additional capacity to store bits being added to the fixed bit portion of the buffer. The buffer is then initialized at, for example, 27 bits so that one can thereby avoid dropping or adding bits to the bit stream.

The output of buffer 38 is fed as one input 40 of modulator 42. Another input 44 of modulator 42 is connected to the output of crystal-controlled, fixed frequency oscillator 46. Now, the station shown in FIG. 1 is selected as the ring monitor during the initialization procedure by operating switches 32 and 36 so that received data output terminal 24 of receiver-modulator 20 is connected to the input of buffer 38 and output terminal 48 of modulator 42 is connected to the ring transmission line. In such case, the received data output from receiver-modulator 20 is modulated onto the clock output of oscillator 46 rather then onto the received clock output as earlier described. Oscillator 46 then serves as the clock reference for the entire ring, each station then tracking a received signal, the basic time reference of which is the oscillator output. When the signal proceeds around the ring back to the ring monitor station, it is still at, on the average, this clock rate. The elasticity buffer insures that any clock fluctuations arising during transit around the ring are followed so that no data bits are lost in the process of receiving data at the monitor and retransmitting that data with an unperturbed clock frequency from oscillator 46.

In the present invention as shown in FIG. 2 (wherein like numerals denote like parts), the circuit used for the reclocking portion of the node is quite similar to that heretofore described with respect to the ring monitor circuit, except that a crystal-controlled oscillator is not employed. Instead, the transmission medium connecting terminals 26 and 28 includes another phase-locked loop 49 formed of voltage-controlled oscillator 50, the output of which is connected to terminal 28 of modulator 30 and also to return loop terminal 52 of phase detector 54. Primary input terminal 56 of detector 54 is connected to received clock output 26 of receiver-demodulator 20, and output terminal 58 of phase detector 54 is connected to the input of filter 60. To complete phase-locked loop 49, the output of filter 60 is connected to voltage control input terminal 62 of voltage-controlled oscillator 50. The ring monitor portion of the node remains as described above. It will be seen that elasticity buffer 38, however, is included in common in both the reclocking circuit and the ring monitor circuit of the node of FIG. 1, being installed between terminal 24 and switch 32 rather than after switch 32 as in the embodiment of FIG. 1. Thus, in the reclocking mode, when the output of buffer 38 is connected to the respective output terminal of switch 32, the buffer output is coupled to received data terminal 29 of modulator 30, and when in the ring monitor mode, the output of the buffer is connected to received data terminal 40 of modulator 42.

In operation of the circuit of FIG. 2 in its reclocking mode (in which, of course, the ring monitor circuit of oscillator 46 and modulator 42 is not connected between the input and output of the node), the received clock present at output terminal 26 of receiver-demodulator 20 is fed to the input of phase-locked loop 49 which provides a signal to input or clocking terminal 28 of modulator 30. Consequently, the noisy clock reference that the prior art reclocking node would have had applied at terminal 28 is replaced by a quieter clock reference inasmuch as the characteristics of filter 60 are selected so that phase-locked loop 49 is much narrower in bandwidth than phase-locked loop 64 forming part of receiver-demodulator 20. Thus, the system provides substantial jitter filtering, and the output frequency from loop 49 becomes equal to the input frequency when averaged over a relatively long time. Since the jitter in the output of the node is much less than that received by receiver-demodulator 20, there, may be a substantial difference on an instantaneous basis between the two clocks. This difference is absorbed by elasticity buffer 38 so that data is not lost.

Since certain changes may be made in the above apparatus without departing from the scope of the invention herein involved, it is intended that all matter contained in the above description or shown in the accompanying drawing shall be interpreted in an illustrative and not in a limiting sense.

What is claimed is:

1. In a local network of the type described in ANSI/IEEE Standard 802.5, a node having a a ring monitor circuit and a reclocking circuit operably alternatively to one another, said network node including a receiver-demodulator incorporated a first phase locked loop and having an input connectable to the network and having an output providing received data and an output providing a received clock, an elasticity buffer connected to the received data output of said receiver-demodulator, and means for modulating said received data onto a clock signal extracted from said received clock, an improvement wherein said reclocking circuit includes:
    a second phase-locked loop connected in a transmission line between said received clock output of said receiver-demodulator and a received data input to said means for modulating, the bandwidth of said second phase-locked loop being narrower than the bandwidth of said first phase-locked loop.

2. In a local area network node as set forth in claim 1 wherein said second phase-locked loop comprises phase detector means having its input connected for receiving said received clock from said received clock output of said demodulator, a voltage-controlled oscillator, and filter means having its input connected to the output of said phase detector means, the output of said filter means being connected as the voltage-controlling input to said voltage-controlled oscillator.

3. In a local area network node as set forth in claim 1 including an elasticity buffer connected between said received data output of said receiver-demodulator and a data input to said means for modulating.

4. In a local area network node as set forth in claim 2 wherein the characteristics of said filter means are selected so that said second phase-locked loop is narrower in bandwidth than said first phase-locked loop.

5. In a local area network of the type described in ANSI/IEEE Standard 802.5, having a set of reclocking nodes serially connected to a transmission medium so that information bits may be transferred sequentially from one active node to the next, an improvement wherein at least one of said reclocking nodes comprises:
    a receiver-demodulator including a first phase-locked loop and having an output providing received data and an output providing a received clock;
    an elasticity buffer having its input connected to said received data output and its output connected to the received data input of said means for modulating;
    means for modulating said received data onto a clock signal extracted from said received clock; and
    a second phase-locked loop connected between said received clock output of said receiver-demodulator and a received clock input to said means for modulating.

6. In a local area network node as set forth in claim 5 wherein said second phase-locked loop comprises phase detector means having its input connected for receiving received clock from said received clock output of said demodulator, a voltage-controlled oscillator, and filter means having its input connected to the output of said phase detector means, the output of said filter means being connected as the voltage-controlling input to said voltage-controlled oscillator.

* * * * *

UNITED STATES PATENT AND TRADEMARK OFFICE
CERTIFICATE OF CORRECTION

PATENT NO. : 5,090,025
DATED : February 18, 1992
INVENTOR(S) : Alan C. Marshall, et al.

It is certified that error appears in the above-identified patent and that said Letters Patent is hereby corrected as shown below:

Claim 1, column 5, line 44, after "local" insert -- area --;

Claim 1, column 5, line 45, delete "a" (third occurrence); and

Claim 1, column 5, line 46, delete "operably" and substitute therefor -- operable --.

Signed and Sealed this

Twenty-second Day of June, 1993

Attest:

MICHAEL K. KIRK

*Attesting Officer*     *Acting Commissioner of Patents and Trademarks*